(No Model.) 4 Sheets—Sheet 1.
J. COUP.
CAR COUPLING.
No. 361,140. Patented Apr. 12, 1887.
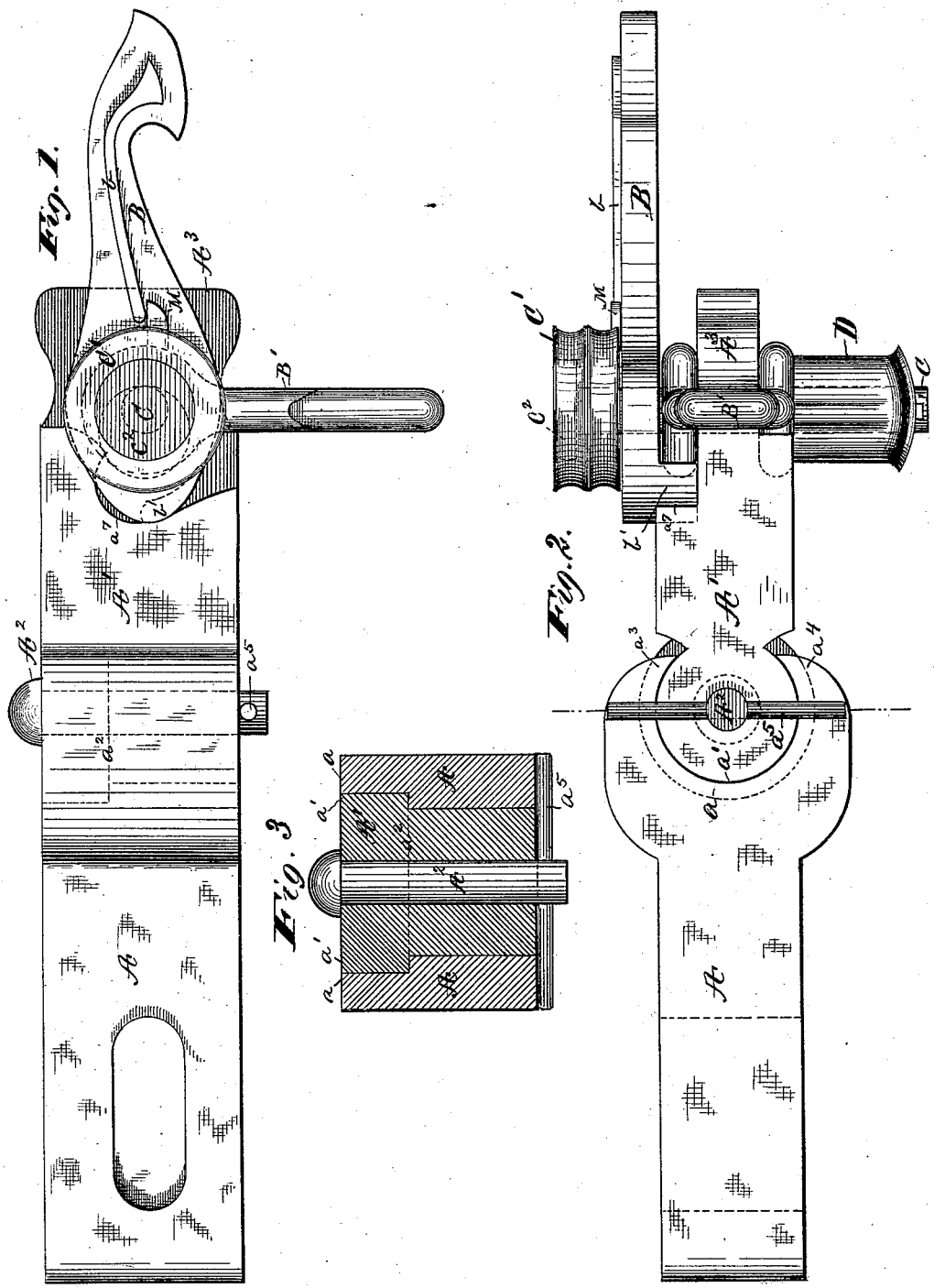

(No Model.) 4 Sheets—Sheet 2.
J. COUP.
CAR COUPLING.
No. 361,140. Patented Apr. 12, 1887.

(No Model.) 4 Sheets—Sheet 3.
J. COUP.
CAR COUPLING.
No. 361,140. Patented Apr. 12, 1887.
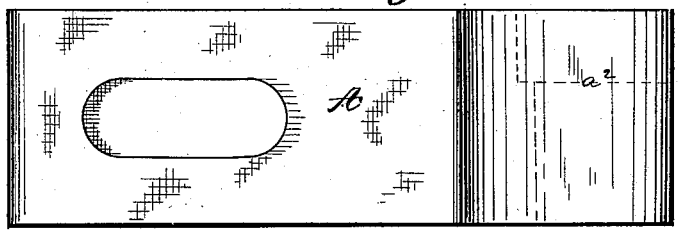
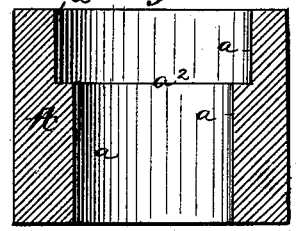
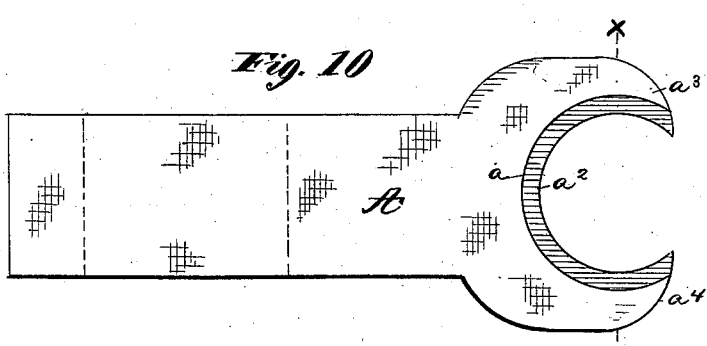
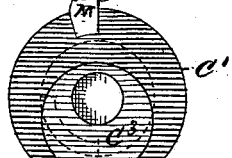
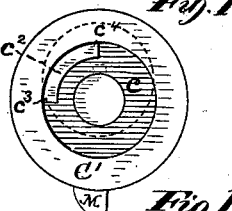
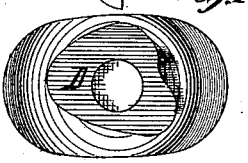
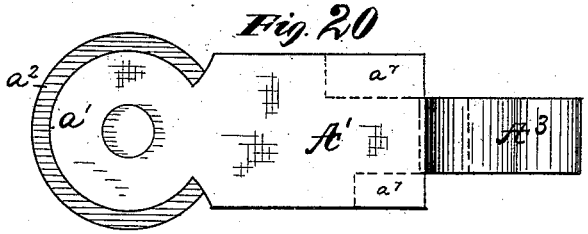
Witnesses:
Gabriel J. W. Galster
S. M. Supple.
Inventor:
John Coup
By Richards
Attorneys.

(No Model.) 4 Sheets—Sheet 4.

J. COUP.
CAR COUPLING.

No. 361,140. Patented Apr. 12, 1887.

Witnesses
Gabriel J. W. Galster.
E. M. Supple.

Inventor
John Coup.
By Richardson
Attorneys

UNITED STATES PATENT OFFICE.

JOHN COUP, OF NEW YORK, N. Y., ASSIGNOR OF ONE-FOURTH TO ELIZABETH M. CARRINGTON AND RANSOM MONROE CARRINGTON, BOTH OF SAME PLACE.

CAR-COUPLING.

SPECIFICATION forming part of Letters Patent No. 361,140, dated April 12, 1887.

Application filed January 11, 1886. Serial No. 188,180. (No model.)

*To all whom it may concern:*

Be it known that I, JOHN COUP, of the city, county, and State of New York, have invented a new and useful Improvement in Car-Couplings; and I hereby declare the following to be a full and clear description thereof.

The object of this invention is to produce an improved car-coupling which may be operated automatically or may be adapted to engage with draw-heads having the old or any form of coupling draw-heads.

The specific nature of the invention relates to improvements on certain forms of car-couplings heretofore invented and patented by myself, in which the coupling-link is made in the form of a swinging hook pivoted at the side of the draw-head on a transverse shaft passing through the draw-head and adapted to engage with a pallet-shaped cam attached to the opposite draw-head. The improvements relate to improved constructions of said coupling-hook and its operating-cam, and to the combination therewith of a link adapted to engage with an old or with almost any particular form of draw-head; also, to lateral and vertical adjustments of the draw-head, &c.

Special features and details of the invention will be hereinafter fully explained.

The invention will be readily understood by reference to the accompanying drawings, of which—

Figure 4:
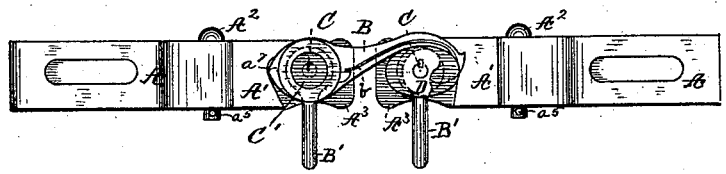
Figure 5:
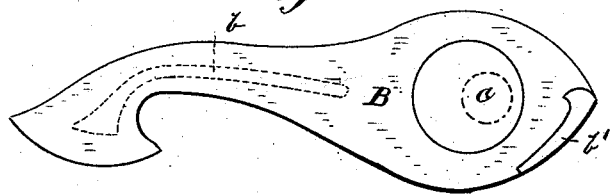
Figure 6:
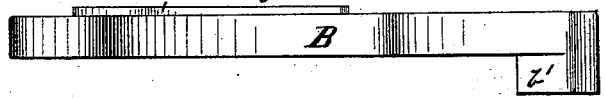
Figure 7:
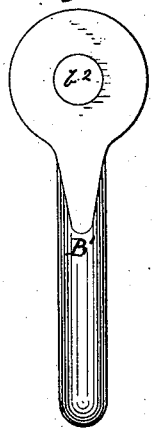
Figure 8:
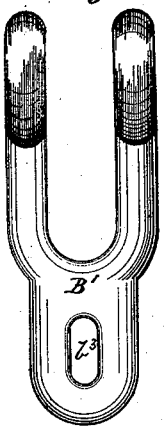
Figure 21:
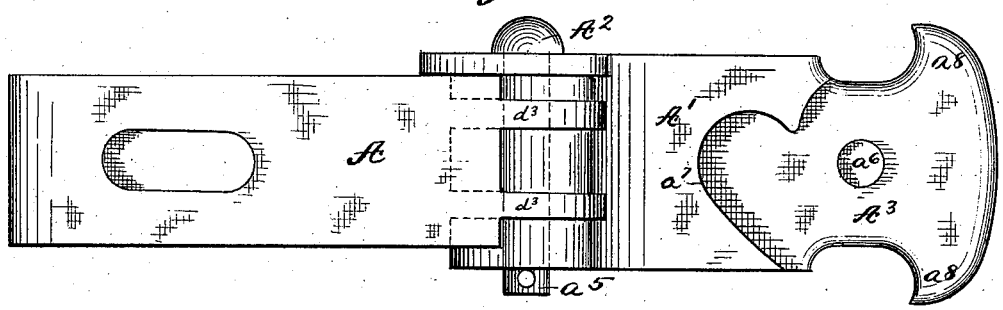
Figure 22:
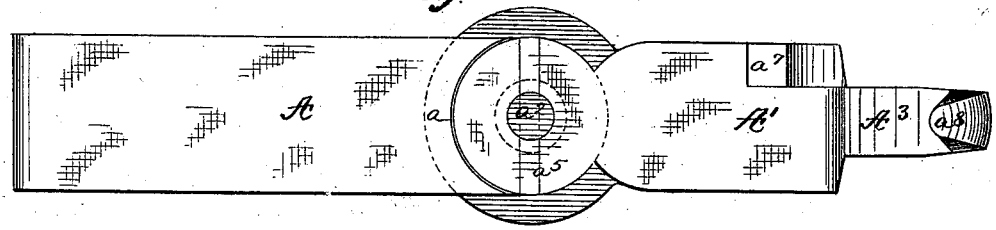
Figure 23:
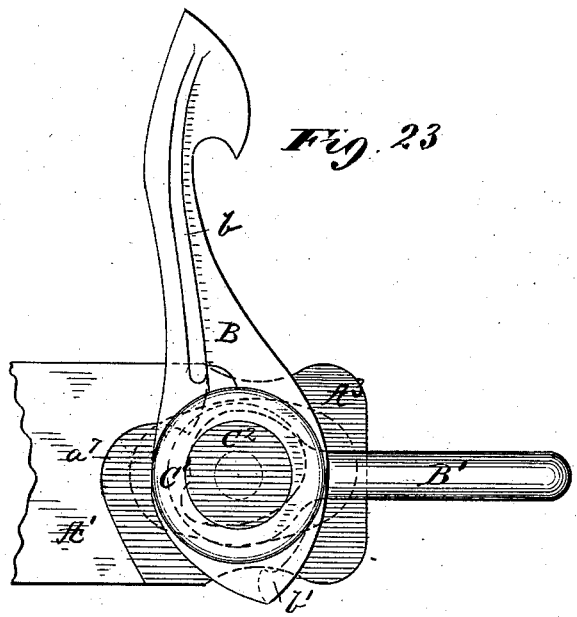
Figure 24:
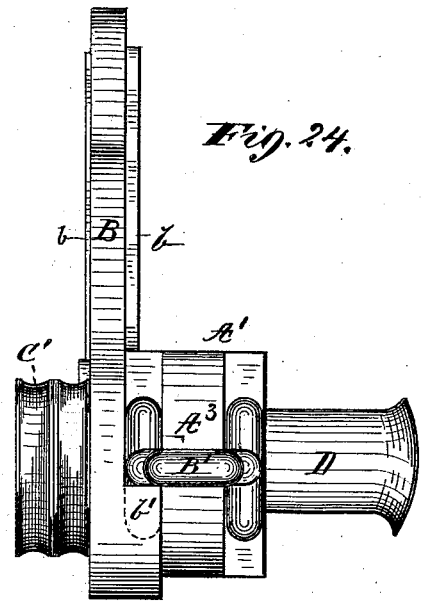

Figure 1 is a side elevation of one of the improved draw-heads, showing the lateral and vertical adjustment of the draw-head and the combination therewith of my improved hooked coupling, and also the linked coupling adapting it to engage with other forms of draw-head. Fig. 2 is a bottom plan of the parts shown in Fig. 1. Fig. 3 is a transverse sectional elevation of the same, taken through the coupling-pin that unites the two sections of my improved draw-head together. Fig. 4 is a general view of a side elevation of two of my improved draw-heads coupled together. Figs. 5 and 6 are respectively a side elevation and plan of my improved coupling-hook. Figs. 7 and 8 are respectively an elevation and a plan of my improved link for adapting my improved couplings to engage with other forms of draw-head. Figs. 9 and 10 are respectively a side elevation and top plan of the car or inner end of my improved draw-head. Fig. 11 is a transverse sectional elevation of the draw-head, part shown in Figs. 9 and 10, and taken on the line $x\ x$ of Fig. 10. Fig. 12 is a sectional elevation of the operating-wheel for rotating the transverse cam-shaft of the draw-head, and also showing the eccentric cam thereto attached. Fig. 13 is a central sectional plan of the parts shown in Fig. 12. Fig. 14 is a side elevation of the operating-wheel shown in Figs. 12 and 13, and showing the clutch which engages with and operates the transverse draw-head shaft as desired. Figs. 15 and 16 are respectively a sectional elevation and a plan of the engaging pallet-shaped cam with which the coupling-hook engages. Figs. 17 and 18 are respectively a longitudinal plan and sectional elevation of the transverse cam-operating shaft of the draw-head. Fig. 18 is taken through the center of the clutch-lug with which the operating-wheel engages to rotate the said shaft. Figs. 19 and 20 are respectively a side elevation and a plan of the outer or coupling end of my improved draw-head. Fig. 21 is a side elevation of a modified form of my improved draw-head. Fig. 22 is a bottom plan of the parts shown in Fig. 21. Fig. 23 is a side elevation of my improved draw-head thrown up into a vertical position, and with the link adapted to old form of draw-heads thrown out into a horizontal position ready for coupling with another car. Fig. 24 is a front end elevation of the parts shown in Fig. 23.

In my improved draw-heads I use a compound construction, dividing it into two sections, A and A'. The part A is the inner end of it, and is constructed for engagement with the car to which it is to be attached. The outer end, A', of the draw-head is constructed so it may carry and be engaged with by the coupling-link. The two parts A and A' are joined together by a knuckle-joint formed of a segmental socket, $a$, in the front end of the draw-head section A and a segmental tenon, $a'$, formed on the rear end of the draw-head section A'. A horizontal shoulder, $a^2$, formed in this socket-joint limits the downward movement of the outer section of the draw-head upon the other part of it. An equivalent construction of these two sections of the draw-head is shown in Figs. 21 and 22. The construction shown in the two said figures above named permits slightly more lateral movement for the outer section of the draw-head than that shown in the other figures. This, however, is a difference only in degree, and so constitutes an equivalent modification. In the said modified form, in lieu of the single horizontal shoulder $a^2$, there are two or more of such shoulders, one section of the draw-head being provided with projecting tenons $d^3$, which fit into re-entering slots formed in the other part. The segmental character of the joint between the two sections of the draw-head is precisely similar in both cases.

In the case of the modified form of the socketed joint shown in Figs. 21 and 22, the socketed part of the said joint includes less than half a circle, so as to provide for excessive lateral movement of the outer section of the draw-head; but in the other forms of constructing these parts the socketed section of the draw-head is made to include more than a half a circle, as shown in Figs. 2, 10, and 20, thus forming the forward ends of the segmental recess into re-entering jaws $a^3$ $a^4$, which are made to embrace the semi-cylindrical part of the coupling-lug of the draw-head section A', as clearly shown in Fig. 2, thus providing for a tensional strain to couple and hold the two parts or sections of the draw-head together without the use of an assembling-pin for fastening them together. A vertical pin, $A^2$, is inserted through a vertical aperture in the draw-head section A, and a transverse key, $a^5$, inserted through a keyhole in the bottom end of the said pin, holds the parts A and A' vertically together upon the engaging-joint $a^2$.

In the modified construction shown in Figs. 21 and 22, the pin $A^2$ is utilized to couple the parts A and A' together. In either case the horizontally or laterally swinging motion allowed to the front end of the section A' about the axis of the pin $A^2$ is provided for the purpose of permitting free lateral movement of the coupling-link as the connected cars round the curves of the roadway.

The front end of the draw-head section A' is formed into a kind of vertical forwardly-projecting tenon $A^3$, and the coupling-hook B is attached to the side of this tenon part by a transverse axle or shaft, C, which passes through the said tenon and carries on its other end the coupling pallet-shaped cam D, with which the coupling-hook of an adjacent car engages, as hereinafter explained. The said shaft or axle C is seated in and rotates in the aperture $a^6$, formed for it in the tenon part $A^3$, and forms a part of the coupling by which the draw-head is coupled with its fellow on the adjacent car. The end of the shaft C which carries the hook B also carries on its outer end (outside of the said hook) a grooved cylindrical drum, C', around the periphery of which, (which is grooved for the purpose) is coiled a cord or chain, (not shown,) by which said cord or chain the said drum and its shaft are rotated or partly rotated, so as to operate the connecting hook or link and the mechanism therewith connected, so as to couple or uncouple the cars, as desired. Suitable provision is made for operating or rotating this drum, by means of its attached cord or chain, from the top or side of the car, in a manner similar to that heretofore described by me in my former applications, and hence I need not particularly describe it herein.

The end of the shaft C on which the hook B is mounted carries a small cylindrical drum, $C^2$, to the inner face of which is fixed a segmental clutch-piece, $c$, which forms, as shown in Fig. 18, about half a circle. This drum and its clutch-lug fit into a chamber, $c'$, in the grooved drum C', which is clearly shown in Figs. 13 and 14. An inwardly-projecting lug, $c^2$, in the said chamber engages with the clutch-piece $c$ of drum $C^2$, and thereby the shaft or axle C is rotated, as required, so as to move the hooked link on one end of it and the pallet-shaped cam on the other end of it, as required, and as hereinafter fully explained. The lug $c^2$ is about one-quarter of a circle in length, and the lug $c$, against which it engages, is about one-half a circle in length, so that the actuating-wheel C' may be rotated about one-quarter of a turn before its radial face $c^3$ or $c^4$ will contact with the contiguous face of the lug $c$. This lost motion is provided for the purpose of rotating the pallet-shaped cam D slightly independently of the drum C', as required for the coupling or uncoupling operation, as specified in my said former applications. As is also described in my said former applications, the cam D is made somewhat in the form of a pallet, that form being best adapted to receive and hold the hooked end of the link B when the said hook couples two cars together.

As in my said former applications, a cylindrical cam, $C^3$, is eccentrically mounted on the shaft C, as shown by the full lines in Figs. 1 and 12 and in dotted lines in Fig. 5. This cylindrical cam is fitted into the cylindrical aperture of the coupling-hook B, as indicated by the dotted line in Fig. 5, showing the eccentric position of the shaft C. In this my improved construction the rear end of the coupling link or hook B fits into and abuts against the curved end surface of a recess, $a^7$, formed in the hook side of the draw-head section A', as shown in Figs. 1, 4, 19, and 23. By means of this construction, as the shaft C is rotated its rotating cam $C^3$, mounted eccentrically thereon, engages in the cam-recess of the hook or link B and throws it forward, so as to release it from the cam or pallet D on the adjacent car, the parts being of course assembled together so as to produce this result; but it is evident that the greatest forward throw of the cam will occur during the first portion of the quarter-revolution of the cam that produces this longitudinal movement of the link or hook B, and to add to this forward throw of the said link or hook B, I add to this construction the horseshoe-shaped curve in the front end and side of the draw-head piece A', and adapt to the said curve the rear end of the link or hook B, so as to engage the curved end of the said hook against the contiguous face of the curved seat of the recess $a^7$. The effect of this construction is to cause the cam $C^3$ to not only throw the said hook B forward by its own forward movement, but also to have the forwardly-sloping face of the seat of the curve of $a^7$ to assist in this forward movement, for, as the cam raises the rear end of the link or hook, so as to cause it to impinge against the sloping face of $a^7$, the forward movement of the link or hook is thereby arrested or augmented.

The hook B has a strengthening-rib, $b$, on one of its sides and a short segmental lug, $b'$, on its inner side near the curved rear or inner end and at the lower side thereof. A connecting-link, B', is bifurcated at its inner end, so that it may embrace the forwardly-projecting end of the tongue or tenon $A^3$, and a hole, $b^2$, through this bifurcated end, as shown in Fig. 7, permits the shaft C to pass therethrough and couple the said link B' with the front section, A', of the draw-head. The said shaft C is allowed to rotate within the aperture $b^2$, except as hereinafter explained. The front or swinging end of the link B' is provided with a hole, $b^3$, as shown in Fig. 8, through which the pin of any ordinary coupling may pass, so as to engage or couple this link with any draw-head.

The parts C, C', $C^2$, $C^3$, B, and B', hereinbefore described, are so constructed and combined together that at the first part of the forward rotation of the grooved wheel C' its attached cam $C^3$ raises up and throws forward the hooked end of the link or coupling-piece B, so as to release it from the hat-pallet-shaped cam D of the adjoining car. When it is desired to couple with the ordinary draw-head and pin, the coupler is manipulated as above described; and then, if the said wheel C' is rotated rearwardly for about a quarter of turn after the lug $c$ shall have engaged with its segmental clutch-piece $c^2$, the outwardly-projecting peripheral lug M, projecting from the periphery of the actuating wheel or drum C', engages with or impinges against the lower edge of the coupling-hook B, or against some projection thereto attached—as, for instance, the stiffening-rib $b$—and thereby causes the free or forward end of the hook B to be raised up into a vertical position, as shown in Figs. 23 and 24, and at the same time and by the same movement the lug $b'$ of the said link or hook B engages with and raises up the supplemental draw-link B', as shown in Figs. 23 and 24, and thus the hook B is thrown up out of the way of the link B', and at the same time the link B' is raised up so as to be in a proper horizontal position, as shown in Fig. 23, to engage with an adjacent draw-head, and by dropping the pin through the opening in said link and into its seat in the draw-head the coupling is complete. The actuating-drum C', with its attached lug M, adapted to engage with and raise the coupling-hook B, may also be used to raise or manipulate the outer end of the said hook only slightly, so as to place it in line of engagement with a car draw-head at a higher or lower elevation.

The draw-head A A', as shown in Figs. 1, 2, 3, and 4, is permitted a vertical adjustment. Supposing the pin $A^2$ to be removed, (and its presence is not necessary in this form of construction,) this vertical adjustment of the parts A and A', each to the other, is provided for in the knuckle-joint $a$ $a'$, before described, the ledge $a^2$ only limiting the downward movement of the part A' within its fellow A, as described. This arrangement leaves the parts A A' free to adapt themselves automatically to cars adjacent to each other and having their draw-heads fixed at different elevations.

The tongue $A^3$ of the forward part of the draw-head may be rounded off at its front corners or formed with hooks $a^8$, projecting vertically therefrom, as shown in Figs. 21 and 22, so as to incidentally couple a hook therewith.

The illustrations on the drawings and the descriptive matter hereinbefore contained referring to the additional inclosed links and the mechanism for operating them, in combination with the specific parts of this invention hereinafter claimed, are for the purpose of assimilating those parts with this invention; but they are not herein claimed, being reserved for a separate application.

Having thus described my invention, what I claim as new, and desire to secure by Letters Patent, is—

1. A car-coupling draw-head formed in two detachable sections, the adjacent ends of which are provided with intersecting members forming a segmental knuckle-joint constructed to admit of lateral movement of both sections and vertical adjustment of one member within the other, substantially as described.

2. A car-coupling draw-head formed in two detachable sections, the adjacent ends of which are provided with intersecting members constructed to secure them against longitudinal displacement and to provide for vertical and lateral adjustment of one member within the other, substantially as described.

3. A car-coupling draw-head formed in two detachable sections, the adjacent end of one of which is provided with a chamber open in front and on its upper and lower side and a rabbet in said chamber, and the other with a cylindrical projection having a shoulder formed thereon to engage with said rabbet to provide for vertical and lateral adjustment of the sections of the draw-head, substantially as described.

4. A car-coupling hook one end of which is provided with an elliptical projection, in combination with a draw-head having a housing formed therein, the rear wall of which is curved, substantially as shown, and for the purpose set forth.

5. A car-coupling hook one end of which is provided with an elliptical projection, a bolt having a cam thereon, and a cam engaging said hook, in combination with a draw-head supporting said hook and bolt and provided with a recess or housing having its rear wall formed in a curve approximately horseshoe shape, substantially as described.

6. A car-coupling draw-head having a transverse bolt in the front end, in combination with a wheel having a cam projecting from one side thereof and a projection on its periphery, and a hook having an eye and a projection to engage with said cam and projection on said wheel, substantially as described.

In witness whereof I hereunto set my hand in presence of two witnesses.

JOHN COUP.

Witnesses:
DANIEL R. GARDEN,
WM. E. RICHARDS.